US006800362B2

(12) United States Patent
Van den Bergh et al.

(10) Patent No.: US 6,800,362 B2
(45) **Date of Patent: *Oct. 5, 2004**

(54) BINDERLESS STORAGE PHOSPHOR SCREEN HAVING VOIDS FILLED UP TO A DEFINED EXTENT

(75) Inventors: Rudy Van den Bergh, Lint (BE); Ludo Joly, Hove (BE)

(73) Assignee: AGFA Gevaert, Mortsel (BE)

( * ) Notice: Subject to any disclaimer, the term of this patent is extended or adjusted under 35 U.S.C. 154(b) by 63 days.

This patent is subject to a terminal disclaimer.

(21) Appl. No.: 10/345,038

(22) Filed: Nov. 20, 2002

(65) Prior Publication Data

US 2003/0124340 A1 Jul. 3, 2003

Related U.S. Application Data

(60) Provisional application No. 60/351,287, filed on Jan. 23, 2002.

(30) Foreign Application Priority Data

Dec. 3, 2001 (EP) ........................................... 01000694

(51) Int. Cl.[7] .............................. B32B 3/26; B32B 5/16

(52) U.S. Cl. .................... 428/304.4; 428/323; 428/325; 442/1

(58) Field of Search ................................ 428/325, 323, 428/304.4; 442/1

(56) References Cited

U.S. PATENT DOCUMENTS

| | | | | |
|---|---|---|---|---|
| 4,059,768 A | * | 11/1977 | Van Landeghem et al. ...... | 250/483.1 |
| 2003/0038249 A1 | * | 2/2003 | Hackenschmied et al. ....... | 250/484.4 |
| 2003/0181109 A1 | * | 9/2003 | Bergh et al. ................... | 442/1 |

FOREIGN PATENT DOCUMENTS

| | | | | |
|---|---|---|---|---|
| EP | 510753 A1 | * | 10/1992 | ............ G21K/4/00 |
| EP | 1 113 458 | | 7/2001 | |
| EP | 1 158 540 | | 11/2001 | |

OTHER PUBLICATIONS

European Search Report, Application No. 01 00 0694, Apr. 17, 2002.

* cited by examiner

*Primary Examiner*—Monique R. Jackson
(74) *Attorney, Agent, or Firm*—Joseph T. Guy; Nexsen Pruet, LLC

(57) ABSTRACT

A binderless stimulable phosphor screen comprises a vapour deposited storage phosphor layer on a support and a protective layer, preferably radiation cured, wherein the vapour deposited phosphor is needle shaped and the phosphor needles have a length, L and voids between them and wherein said protective layer fills said voids for at most 0.10 times L.

18 Claims, No Drawings

BINDERLESS STORAGE PHOSPHOR SCREEN HAVING VOIDS FILLED UP TO A DEFINED EXTENT

The application claims the benifit of U.S. provisional application No. 60/351,287 filed Jan. 23, 2002

FIELD OF THE INVENTION

The present invention relates to a binderless storage phosphor screen with vapour deposited phosphors.

BACKGROUND OF THE INVENTION

A well known use of storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel to stimulate the release of stored energy as light that is detected and converted to sequential electrical signals which (are) be processed to produce a visible image. For this purpose, the phosphor should store as much as possible of the incident X-ray energy and emit as little as possible of the stored energy until stimulated by the scanning beam. This is called "digital radiography" or "computed radiography".

Since in the above described X-ray recording systems the X-ray conversion screens are used repeatedly, it is important to provide them with an adequate topcoat for protecting the phosphor containing layer from mechanical and chemical damage. This is particularly important for photostimulable radiographic screens where screens are often transported in a scanning module—wherein the stimulation of the stored energy takes place—while not being not encased in a cassette but is used and handled as such without protective encasing.

A protective layer can be coated onto the phosphor containing layer by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bound to the phosphor layer as described in published EP-A-392 474.

According to a further known technique a protective overcoat is produced with a radiation-curable composition. Use of a radiation curable coating as protective top layer in a X-ray conversion screen is described e.g. in EP-A-209 358 and JP-A-86 176 900 and U.S. Pat. No. 4,893,021. For example, the protective layer comprises a UV cured resin composition formed by monomers and/or prepolymers that are polymerized by free-radical polymerisation with the aid of a photoinitiator. The monomeric products are preferably solvents for the prepolymers used.

In U.S. Pat. No. 6,120,902 an intensifying screen is disclosed carrying a radiation cured protective layer and having a determined unevenness. In U.S. Pat. No. 4,059,768 the use of polymeric beads containing fluoro-moieties in intensifying screens is disclosed so as to have screens with good transportability. In U.S. Pat. No. 5,401,971 storage phosphor screens are disclosed comprising a protective layer coated from a solution in butanone of a miscible blend of poly(vinylidene fluoride-co-tetrafluoroethylene) and poly(1 to 2 carbonalkyl) methacrylate.

Although all screens disclosed in this prior art can yield X-ray images with good quality, there is still a need for storage phosphor screens with increased physical strength that can be transported in scanner without risk of jamming, can withstand the wear and the tear of transporting and present no or low risk of electrical charging.

OBJECTS AND SUMMARY OF THE INVENTION

It is an object of the invention to provide a binderless stimulable phosphor screen useful in an X-ray recording system with a strong protective layer and that can be transported easily through a scanning module without causing jamming.

The above mentioned object is realized by providing a stimulable phosphor screen having the specific features defined in claim 1. Specific features for preferred embodiments of the invention are disclosed in the dependent claims.

Further advantages and embodiments of the present invention will become apparent from the following description and drawings.

DETAILED DESCRIPTION OF THE INVENTION

By "vapour deposited phosphor" it is, throughout this text, meant a phosphor that is deposited on a substrate by any method selected from the group consisting of thermal vapour deposition, chemical vapour deposition, electron beam deposition, radio frequency deposition and pulsed laser deposition. This vapour deposition is preferably carried out under conditions as described in EP-A-1 113 458.

When vapour deposited phosphor layers contain needle shaped phosphors separated by voids as disclosed in, e.g., the above mentioned EP-A-1 113 458, the phosphor layer is quite sensitive for mechanical impact. It is common practice to apply a protective layer on top of the phosphor layer to enhance the strength, but it was now found that the strength of the surface of the screen could even be enhanced further if the protective layer was coated from a solution that has a viscosity so that the coating solution of the protective layer seeps into the voids between the phosphor needles. It was found that a very acceptable compromise between the strength of the surface and the ease of recuperation of the phosphor could be achieved when the solution of the protective layer was adapted so that, with phosphor needles having a length, L, said protective layer fills said void for at most 0.10 times L. Preferably the viscosity of the coating solution of the protective layer is adjusted so that the protective layer fills the voids for at most 0.05 times L. The needed viscosity depends on the width of the voids between the phosphor needles and is easily determined by, e.g,. measuring it on an electromicrosopic image of the screen.

Any coating composition of a protective coating, known in the art, can be used in the preparation of the protective layer of a screen of this invention as long as the viscosity of this composition is adapted so that said protective layer fills the voids between phosphor needles with a length, L, for at most 0.10 times L.

Preferably the protective layer is prepared by applying a radiation curable solution.

The present invention thus incorporates also a method for producing a binderless phosphor screen comprising the steps of

- forming a vapour deposited storage phosphor layer on a support, applying a liquid radiation-curable coating composition on said phosphor layer and radiation curing said composition.

Very useful radiation curable compositions for forming a protective coating according to the present invention contain as primary components:

(1) a crosslinkable prepolymer or oligomer or a mixture of crosslinkable prepolymers or oligomers, (2) a reactive diluent monomer or mixture of reactive diluent monomers, and (3) in the case of an UV curable formulation a photoinitiator.

The usual amounts of these primary components calculated on the total coating composition are 30–100% by weight for the prepolymer, 10–70% by weight for the reactive diluent and 0–10% by weight for the photoinitiator. Optionally minor amounts (e.g. 5% by weight) of non-reactive organic solvent for the prepolymer may be present.

Although any radiation curable composition known in the art, as e.g., the composition disclosed in EP-A-510 753, it is preferred to have a coating solution containing fluorinated compounds so that the finished protective layer comprises at least 1% mol/mol of fluorinated moieties. Preferably the coating composition is so that composition the finished protective layer comprises between 5% and 50% (mol/mol) of fluorinated moieties.

The fluorinated moieties can be present either in said crosslinkable prepolymer or oligomer or in said reactive diluent monomer or in both. Preferably the fluorinated moieties are added by using as diluent monomer a fluorinated monomer or by adding a fluorinated monomer to the mixture of diluent monomers. Very useful fluorinated monomers for adding fluorinated moieties to the protective layer of a storage panel of this invention are, e.g., $C_8F_{17}CH_2CH_2N(CH_3)COCH{=}CH_2$, $C_8F_{17}CH_2CH_2OCOCH{=}CH_2$, $C_6F_{13}C_2H_{45}COCH{=}CH_2$, $C_7F_{15}CH_2OCOC(CH_3){=}CH_2$, $C_8F_{17}SO_2N(C_2H_5)C_2H_4NHCOCH{=}CH_2$, $(CF_3)_2CF(CF_2)_8C_2H_2SCOC(CH_3){=}CH_2$, $C_8F_{17}SO_2N(CH_3)C_2H_4COOCH{=}CH_2$, $C_6F_{13}CH_2CH_2OOCC({=}CH_2)COOCH_2CH_2C_6F_{13}$, $C_7F_{15}CH_2OOCCH{=}CHCOOCH_2C_7F_{15}$, $C_6F_{13}C_2H_4N(CH_2CH_2OH)COCO{=}CH_2$, $C_7F_{15}CON(C_2H_5)C_3H_6SCOC(CH_3){=}CH_2$, $C_6F_{13}CH_2NHCOCO{=}CH_2$, $C_8F_{17}CH_2CH_2OCH{=}CH_2$, $(CF_3)_2CF(CF_2)_6CH_2CH(OH)CH_2OCOCH{=}CH_2$, $(CH_3)_2CFOC_2F_4OCOCH{=}CH_2$, $C_8F_{17}C_2H_4SO_2N(C_3H_7)C_2H_4OCOCH{=}CH_2$, $C_7F_{15}C_2H_4CONHC_4H_8OCOCH{=}CH_2$

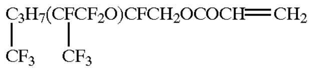

$C_7F_{15}COOCH_2C(CH_3)_2CH_2OCOC(CH_3){=}CH_2$, $C_8F_{17}SO_2N(C_2H_5)C_2H_4OCOCH{=}CH_2$, $(C_3F_7)_2C_6H_3SO_2N(CH_3)C_2H_4OCOCH{=}CH_2$, $C_8F_{17}CF{=}CHCH_2N(CH_3)CH_2H_4OCOCH{=}CH_2$, $C_8F_{17}SO_2N(C_2H_5)C_2H_4NHCOCH{=}CH_2$, $C_8F_{17}SO_2N(CH_3)C_2H_4OCOCH{=}CH_2$, $C_8F_{17}SO_2N(C_2H_5)C_2H_4OCOC(CH_3){=}CH_2$, $C_8F_{17}SO_2N(CH_3)CH_2C_6H_4CH{=}CH_2$, $C_8F_{17}C_2H_4SO_2N(C_3H_7)C_2H_4OCOCH{=}CH_2$, $C_8F_{17}SO_2N(C_2H_5)C_4H_8OCOCH{=}CH_2$, and $(C_3F_7)_2C_6H_3SO_2N(CH_3)C_2H_4OCOCH{=}CH_2$ and combinations thereof.

As said above, the fluorinated monomers can be used as diluent monomer(s) or can be used in combination with non-fluorinated diluent moieties. Very useful non-fluorinated diluent monomers for use in this invention are: methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, tetrahydrofurfurylmethacrylate and the like.

When the fluorinated moieties are present in the crosslinkable prepolymer or oligomer then preferably a mixture of fluorinated and non-fluorinated prepolymers is used. Examples of fluorinated prepolymers—useful to bring fluorinated moieties in the protective layer of this invention—are, e.g, fluorinated polyester acrylates wherein the polyester includes fluorinated moieties brought in the polyester via fluorinated di- or poly-ols or via fluorinated di- or polycarboxylic acid. Very suitable fluorinated diols and polyesters derived therefrom are those described in, e.g., U.S. Pat. Nos. 4,957,986, 5,004,790 and 5,109,103. Examples of suitable diols are, e.g., 3,3,4,4,5,5,6,6-octafluorooctan-1,8-diol, or 2,2,3,3-tetrafluoro-1,4-butanediol, most suitable diols are diols with formula $HOCH_2(CF_2)_nCH_2OH$, wherein $2 \leqq n \leqq 10$. Suitable fluorinated poly- or diacids are those corresponding to the formula $HOOC(CF_2)nCOOH$ or the methylesters thereof. Also terephthalic acid carrying —O—$(CH_2)_{10}$—$(CF2)_9$—$CF_3$ as a side group can be used to produce a fluorinated prepolymer useful in a screen of this invention. In both cases the polyester can then be functionalized with acrylates as described in EP-A-207 257. It is also possible to introduce the fluorinated moieties via the acrylation step; when using polyesters as described in, e.g., EP-A-207 257, these are functionalized by using fluorinated acrylates, as those shown above.

When fluorinated prepolymers or oligomers are used, these can be mixed with non-fluorinated prepolymers or oligomers. Examples of suitable non-fluorinated prepolymers for use in a radiation-curable composition applied according to the present invention are the following unsaturated polyesters, e.g. polyester acrylates; urethane modified unsaturated polyesters, e.g. urethane-polyester acrylates. Liquid polyesters having an acrylic group as a terminal group, e.g. saturated co-polyesters which have been provided with acryltype end groups are described in published EP-A-207 257.

When the radiation-curing is carried out with ultraviolet radiation (UV), a photoinitiator is present in the coating composition to serve as a catalyst to initiate the polymerisation of the monomers and their optional cross-linking with the pre-polymers resulting in curing of the coated protective layer composition. A photosensitizer for accelerating the effect of the photoinitiator may be present.

Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc.

A particularly preferred photoinitiator is 2-hydroxy-2-methyl-1-phenyl-propan-1-one which product is marketed by E. Merck, Darmstadt, Germany under the trade name DRACUT 1173.

The above mentioned photopolymerisation initiators may be used alone or as a mixture of two or more.

Examples of suitable photosensitizers are particular aromatic amino compounds as described e.g. in GB-A-1 314 556, GB-A-1 486 911, U.S. Pat. No. 4,255,513 and merocyanine and carbostyril compounds as described in U.S. Pat. No. 4,282,309.

To the radiation-curable coating composition there may be added a storage stabilizer, a colorant, and other additives, and then dissolved or dispersed therein to prepare the coating liquid for the protective layer. In addition to these primary components additives may be present, e.g. surfactants, solid lubricants, e.g. waxes, de-foamers and plasticizers.

When so desired or needed, the protective layer of this invention can include spacing particles for further increasing the transportability and adjusting the electrostatic properties. Suitable spacing agents in the form of friction reducing polymer beads selected from the group consisting of solid polystyrene, solid polyalkylene and a solid organic fluorinated polymer. Preferably the spacing agents are beads incorporating fluorinated moieties. Such beads have been described in U.S. Pat. No. 4,059,768. In the construction of the scanning apparatus used for reading storage phosphor screens the trend is towards more and more compact apparatus, so that the distance between the (moving) storage phosphor screen and mechanical (moving) parts of the scanner can become very low and can become measured in 10 to 100 $\mu$m. When then a storage phosphor screen with a protective layer according to this invention has protruding beads it is important that the beads do not touch mechanical parts of the scanner and that this is true even when the storage panel shows some wobble during transport in the scanner. Therefore beads used as spacing particles in a storage phosphor screen of this invention have preferably a volume median diameter, $d_{v50}$, so that 5 $\mu m \leqq dv50 \leqq 25$ $\mu$m and a numeric median diameter, $d_{n50}$, so that $1 \leqq d_{v50}/d_{n50} \leqq 1.20$. Further the beads are preferably adapted to the thickness, t, of the protective layer on the storage panel of this invention so that and said polymeric beads have a volume median diameter, $d_{v50}$, so that $1.25 \leqq d_{v50}/t \leqq 4.0$.

The phosphor layer of a binderless storage phosphor screen according to this invention can be prepared by vacuum deposition of the storage phosphor crystals on the substrate as well as by combining (mixing) the ingredients for the storage phosphor (phosphor precursors) and then evaporating this mixture so as to have the phosphor formed in situ during evaporation.

The storage phosphor in a binderless storage phosphor screen according to this invention can be any storage phosphor known in the art.

Preferably the storage phosphor in a binderless storage phosphor screen of this invention is an alkali metal phosphor Suitable phosphors are, e.g., phosphors according to formula I:

$$M^{1+}X.aM^{2+}X'_2bM^{3+}X''_3:cZ \qquad (I)$$

wherein:

- $M^{1+}$ is at least one member selected from the group consisting of Li, Na, K, Cs and Rb,
- $M^{2+}$ is at least one member selected from the group consisting of Be, Mg, Ca, Sr, Ba, Zn, Cd, Cu, Pb and Ni,
- $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga,
- Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leqq a \leqq 1$, $0 \leqq b \leqq 1$ and $0 \leqq c \leqq 0.2$. Such phosphors have been disclosed in, e.g., U.S. Pat. No. 5,736,069.

Highly preferred storage phosphors for use in a binderless phosphor screen of this invention are CsX:Eu stimulable phosphors, wherein X represents a halide selected from the group consisting of Br and Cl prepared by a method comprising the steps of :

- mixing said CsX with between 10–3 and 5 mol % of an Europium compound selected from the group consisting of $EuX'_2$, $EuX'_3$ and EuOX', X' being a member selected from the group consisting of F, Cl, Br and I,
- firing said mixture at a temperature above 450° C.
- cooling said mixture and
- recovering the CsX:Eu phosphor.

Most preferably a CsBr:Eu stimulable phosphor, is used prepared by a method comprising the steps of:

- mixing said CsX with between $10^{-3}$ and 5 mol % of an Europium compound selected from the group consisting of $EuX'_2$, $EuX'_3$ and EuOX', X' being a member selected from the group consisting of F, Cl, Br and I,
- firing said mixture at a temperature above 450° C.
- cooling said mixture and
- recovering the CsX:Eu phosphor.

The phosphor layer of the binderless screen can be prepared by bringing the finished phosphor on the support by any method selected from the group consisting of thermal vapour deposition, chemical vapour deposition, electron beam deposition, radio frequency deposition and pulsed laser deposition.

It is also possible to bring the alkali metal halide and the dopant together and depositing them both on the support in such a way that the alkali metal phosphor is doped during the manufacture of the screen. Thus the invention encompasses a method for manufacturing a phosphor screen containing a CsX:Eu stimulable phosphor, wherein X represents a halide selected from the group consisting of Br and Cl comprising the steps of:

- bringing multiple containers of said CsX and an Europium compound selected from the group consisting of $EuX'_2$, $EuX'_3$ and EuOX', X' being a halide selected from the group consisting of F, Cl, Br and I in condition for vapour deposition and
- depositing, by a method selected from the group consisting of, thermal vapour deposition, chemical vapour deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition can proceed from a single container containing a mixture of the starting compounds in the desired proportions.

Thus the method encompasses further a method for manufacturing a storage phosphor screen containing a CsX:Eu stimulable phosphor, wherein X represents a halide selected from the group consisting of Br and Cl comprising the steps of.

- mixing said Csx with between $10^{-3}$ and 5 mol % of an Europium compound selected from the group consisting of $EuX'_2$, $EuX'_3$ and EuOX', X' being a halide selected from the group consisting of F, Cl, Br and I;
- bringing said mixture in condition for vapour deposition and depositing said mixture on a substrate by a method selected from the group consisting of physical vapour deposition, thermal vapour deposition, chemical vapour deposition, electron beam deposition, radio frequency deposition and pulsed laser deposition.

What is claimed is:

1. A binderless stimulable phosphor screen having a support and a vapour deposited phosphor layer and a protective layer on top of said phosphor layer characterized in that said vapour deposited phosphor is needle shaped and said phosphor needles have a length, L and voids between them and wherein said protective layer fills said void for at most 0.10 times L.

2. A binderless stimulable phosphor screen according to claim 1, wherein said protective layer fills said void for at most 0.05 times L.

3. A binderless stimulable phosphor screen according to claim 1, wherein said protective layer is radiation cured.

4. A binderless stimulable phosphor screen according to claim 2, wherein said protective layer is radiation cured.

5. A binderless stimulable phosphor screen according to claim 1, wherein said protective layer comprises at least 1% (mol/mol) of moieties carrying fluor-atoms.

6. A binderless stimulable phosphor screen according to claim 2, wherein said protective layer comprises at least 1% (mol/mol) of moieties carrying fluor-atoms.

7. A binderless stimulable phosphor screen according to claim 1, wherein said protective layer comprises between 5% mol/mol and 50% mol/mol, both limits included of moieties carrying fluor-atoms.

8. A binderless stimulable phosphor screen according to claim 2, wherein said protective layer comprises between 5% mol/mol and 50% mol/mol, both limits included of moieties carrying fluor-atoms.

9. A binderless stimulable phosphor screen according to claim 1, wherein said protective layer further comprises polymeric beads with a volume median diameter, $d_{v50}$, so that 5 $\mu m \leqq dv50 \leqq 25$ $\mu m$ and a numeric median diameter, $d_{n50}$, so that $1 \leqq d_{v50}/d_{n50} \leqq 1.20$.

10. A binderless stimulable phosphor screen according to claim 2, wherein said protective layer further comprises polymeric beads with a volume median diameter, $d_{v50}$, so that 5 $\mu m < dv50 \leqq 25$ $\mu m$ and a numeric median diameter, $d_{n50}$, so that $1 \leqq d_{v50}/d_{n50} \leqq 1.20$.

11. A binderless stimulable phosphor screen according to claim 1, wherein said protective layer has a thickness, t, so that 1 $\mu m \leqq t \leqq 10$ $\mu m$ and said polymeric beads have a volume median diameter, $d_{v50}$, so that $1.25 \leqq d_{v50}/t \leqq 4.0$.

12. A binderless stimulable phosphor screen according to claim 2, wherein said protective layer has a thickness, t, so that 1 $\mu m \leqq t \leqq 10$ $\mu m$ and said polymeric beads have a volume median diameter, $d_{v50}$, so that $1.25 \leqq d_{v50}/t \leqq 4.0$.

13. A binderless stimulable phosphor screen according to claim 1, wherein said needle-shaped phosphor crystals are crystals of an alkali metal phosphor.

14. A binderless stimulable phosphor screen according to claim 2, wherein said needle-shaped phosphor crystals are crystals of an alkali metal phosphor.

15. A binderless stimulable phosphor screen according to claim 13, wherein said alkali metal phosphor is a CsX:Eu stimulable phosphor, wherein X represents a halide selected from the group consisting of Br and Cl.

16. A binderless stimulable phosphor screen according to claim 14, wherein said alkali metal phosphor is a CsX:Eu stimulable phosphor, wherein X represents a halide selected from the group consisting of Br and Cl.

17. A binderless stimulable phosphor screen according to claim 15, wherein said CsX:Eu stimulable phosphor is prepared by a method comprising the steps of:

mixing said CsX with between $10^{-3}$ and 5 mol % of an Europium compound selected from the group consisting of $EuX'_2$, $EuX'_3$ and EuOX', X' being a member selected from the group consisting of F, Cl, Br and I, firing said mixture at a temperature above 450° C.

cooling said mixture and recovering the CsX:Eu phosphor.

18. A binderless stimulable phosphor screen according to claim 16, wherein said CsX:Eu stimulable phosphor is prepared by a method comprising the steps of:

mixing said CsX with between $10^{-3}$ and 5 mol % of an Europium compound selected from the group consisting of $EuX'_2$, $EuX'_3$ and EuOX', X' being a member selected from the group consisting of F, Cl, Br and I, firing said mixture at a temperature above 450° C.

cooling said mixture and recovering the CsX:Eu phosphor.

* * * * *